United States Patent [19]
Lind

[11] Patent Number: 6,107,632
[45] Date of Patent: Aug. 22, 2000

[54] MICROMINIATURE NEUTRON DETECTOR

[75] Inventor: Eric J. Lind, La Mesa, Calif.

[73] Assignee: The United States of America as represented by the Secretary of the Navy, Washington, D.C.

[21] Appl. No.: 09/046,142

[22] Filed: Mar. 23, 1998

[51] Int. Cl.[7] ..................................................... G01T 3/00
[52] U.S. Cl. ........................................................ 250/390.01
[58] Field of Search ........................... 250/370.05, 390.01

[56] References Cited

U.S. PATENT DOCUMENTS

| | | |
|---|---|---|
| 4,754,139 | 6/1988 | Ennulat et al. . |
| 5,054,936 | 10/1991 | Fraden . |
| 5,258,621 | 11/1993 | Noble . |
| 5,280,173 | 1/1994 | Morse et al. . |
| 5,298,748 | 3/1994 | Kenny et al. . |
| 5,315,247 | 5/1994 | Kaiser et al. . |
| 5,335,243 | 8/1994 | Kubena et al. . |
| 5,397,420 | 3/1995 | Sakakibara et al. . |
| 5,406,109 | 4/1995 | Whitney . |
| 5,489,781 | 2/1996 | Mohr et al. ........................... 250/385.1 |
| 5,614,722 | 3/1997 | Solberg et al. ......................... 250/374 |

FOREIGN PATENT DOCUMENTS 0 479 334 A2   4/1992   European Pat. Off. .......... 250/390.01

*Primary Examiner*—Constantine Hannaher
*Attorney, Agent, or Firm*—Harvey Fendelman; Michael A. Kagan; Eric James Whitesell

[57] ABSTRACT

A microminiature neutron radiation detector includes an ionization well formed in an electrically conductive substrate for coupling to a bias voltage to establish an electric field, a pressurized atmosphere substantially filling the ionization well for generating ions inside the ionization well from neutron collisions, and a collection electrode coupled to the ionization well for collecting the ions driven to the collection electrode by the electric field.

8 Claims, 4 Drawing Sheets

MICROMINIATURE NEUTRON DETECTOR

BACKGROUND OF THE INVENTION

The present invention relates to radiation detectors. More specifically, but without limitation thereto, the present invention relates to a microminiature neutron detector for increasing the signal to noise ratio of ionization signals generated by incident radiation.

$^3$He neutron detector tubes are representative of the state of the art in detecting neutron radiation. The detection signals generated by such detectors may be calculated from the formula Vs=Qi/Ct, where Vs is the voltage signal generated by the detector, Qi is the charge induced by the incident neutron (typically about 20,000 electrons), and Ct is the capacitance of the detector. The capacitance of the detector has been a limiting factor in increasing the magnitude of Vs to a level above the noise from sources such as EMI, microphonics, thermal noise, and bias supply noise. A typical neutron detector tube rugged enough to withstand the high pressures required for neutron interaction (typically about 60 atm) and a volume large enough to provide counts significantly above the background level from neutron sources of interest is a concentric tubular capacitor about 18 inches in length. The capacitance of such a detector tube is about 20 Pf. The capacitance limits the typical voltage signal from such a detector tube to about 4 mV, which may be very difficult to distinguish from the noise background. A continuing need exists for a neutron detector having an output voltage signal level that may readily be distinguished from the noise background.

SUMMARY OF THE INVENTION

The microminiature radiation detector of the present invention is directed to overcoming the problems described above, and may provide further related advantages. No embodiment of the present invention described herein shall preclude other embodiments or advantages that may exist or become obvious to those skilled in the art.

A microminiature neutron radiation detector of the present invention comprises an ionization well formed in an electrically conductive substrate for coupling to a bias voltage to establish an electric field, a pressurized atmosphere substantially filling the ionization well for generating ions inside the ionization well from neutron collisions, and a collection electrode coupled to the ionization well for collecting the ions driven to the collection electrode by the electric field.

An advantage of the microminiature radiation detector is that ionization caused by incident radiation may be detected with a high signal to noise ratio.

Another advantage is that a charge amplifier may be integrated with each ionization well to amplify the ionization signal at the signal source.

Yet another advantage is that the microminiature radiation detector may be operated at low power levels.

Still another advantage is that charge amplifiers and associated electronic circuits may be integrated with the microminiature radiation detector on a common semiconductor substrate.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

Figure 1:
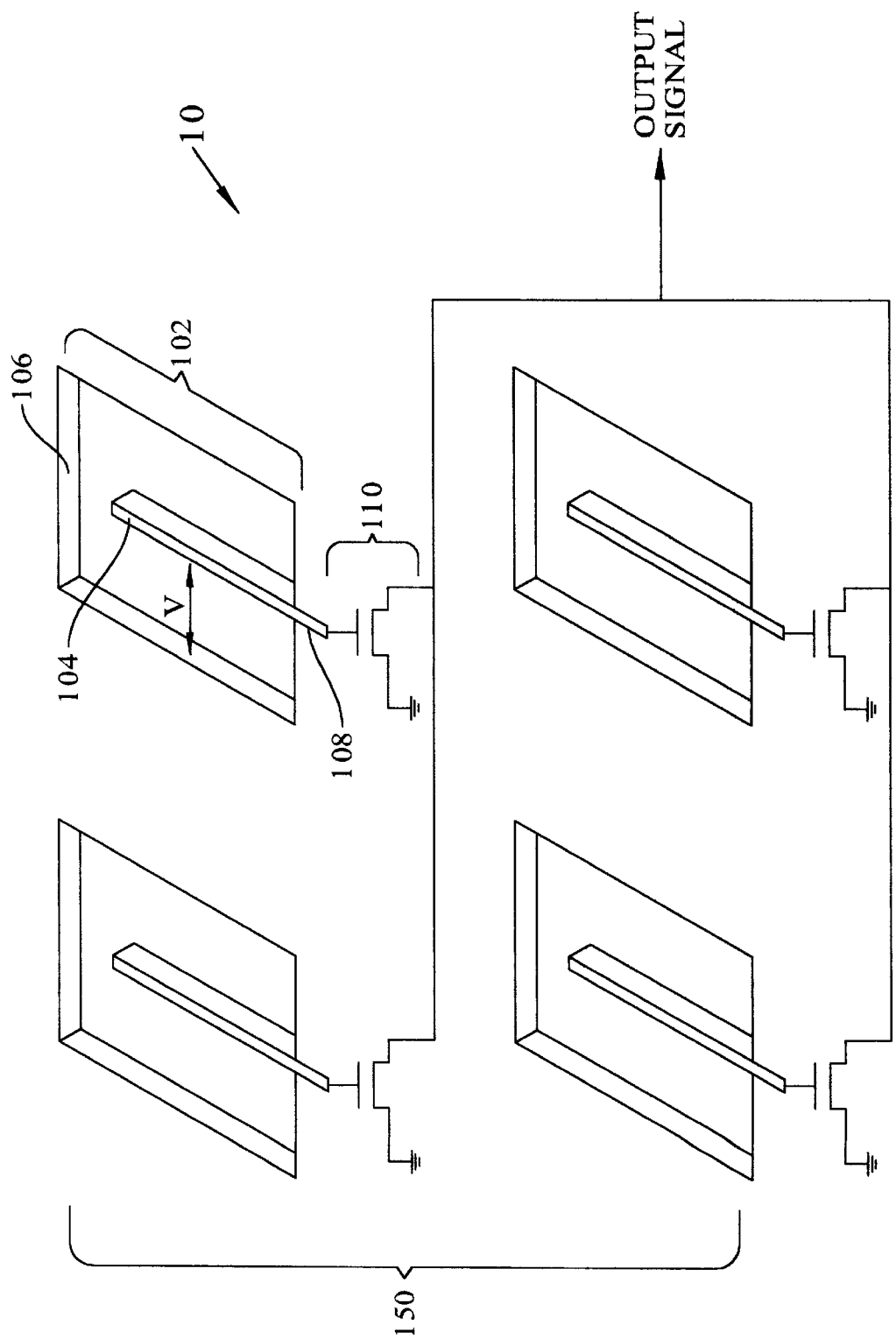
FIG. 1 illustrates a microminiature radiation detector formed in a semiconductor substrate with integrated voltage amplification field-effect transistors.

In FIG. 1 a microminiature radiation detector 10 comprises an array of ionization wells 102 and collection electrodes 104 formed in a substrate 106. Substrate 106 and collection electrodes 104 may be made of an electrically conductive material such as n-type or p-type silicon and formed by well known semiconductor etching and micromachining techniques. A top conducting layer (not shown) may be bonded to substrate 106 according to well known techniques to fully enclose ionization well 102. Collection electrodes 104 may be electrically insulated from substrate 106 by, for example, an insulating layer of silicon dioxide 108. For a neutron detector, the dimensions of ionization well 102 preferably exceed the average collision volume caused by neutron scattering to avoid reduction of sensitivity due to ionization reduction at the well walls. The average collision distance of neutron reactions is about 60 microns. For an ionization well size of 250 microns on a side, only about 4 percent of neutron reactions occur at the sides of the well, i.e., sensitivity reduction due to multiple well collection would be less than 4 percent. The capacitance of an ionization well having these dimensions is about 8 fF. Ionization well 102 is preferably filled with a pressurized atmosphere of, for example, $^3$He to generate ions from neutron collisions.

The ion charges are collected at collection electrode 104 by biasing the sides, top (removed to show detail) and bottom of ionization well 202 with a bias voltage V referenced to collection electrode 104. The bias voltage should be sufficient to establish an electric field for driving the ions to collection electrode 104 within a time that is less than the ion recombination time. Collection electrode 104 couples the charge voltage to FET 110, typically about 4 volts. This voltage is adequate to drive FET 110 to saturation, providing sense currents of about 100 $\mu$A. This detector arrangement minimizes power consumption provided the input voltage to FET 110 is sufficiently above FET 110's gate threshold. FET 110 generates a corresponding output signal that may be parallel connected in an array of neutron detectors 150 of the present invention as shown to increase detection sensitivity. FET 110 may be fabricated on substrate 106 according to well known semiconductor manufacturing techniques. The total capacitance may be expressed as $$C_t = C_G + C_e \quad (1)$$

where $C_G$ is the gate-to-source capacitance of FET 110 and $C_e$ is the capacitance of collection electrode 104. The gate-to-source capacitance of FET 110 may be expressed as $$C_G = k_0 \epsilon_0 Z L / X_0 \quad (2)$$

where $k_0$ is the relative dielectric constant, $X_0$ is the ionization well thickness, and Z and L are the width and length of the ionization well. For an FET with z=2 microns, L=2 microns, $X_0=0.025$ microns, $C_G=0.01$ Pf, and total capacitance $C_t=20$ pF. The sensitivity is correspondingly about 1,000 times that of current $^3$He tubes.

Figure 2:
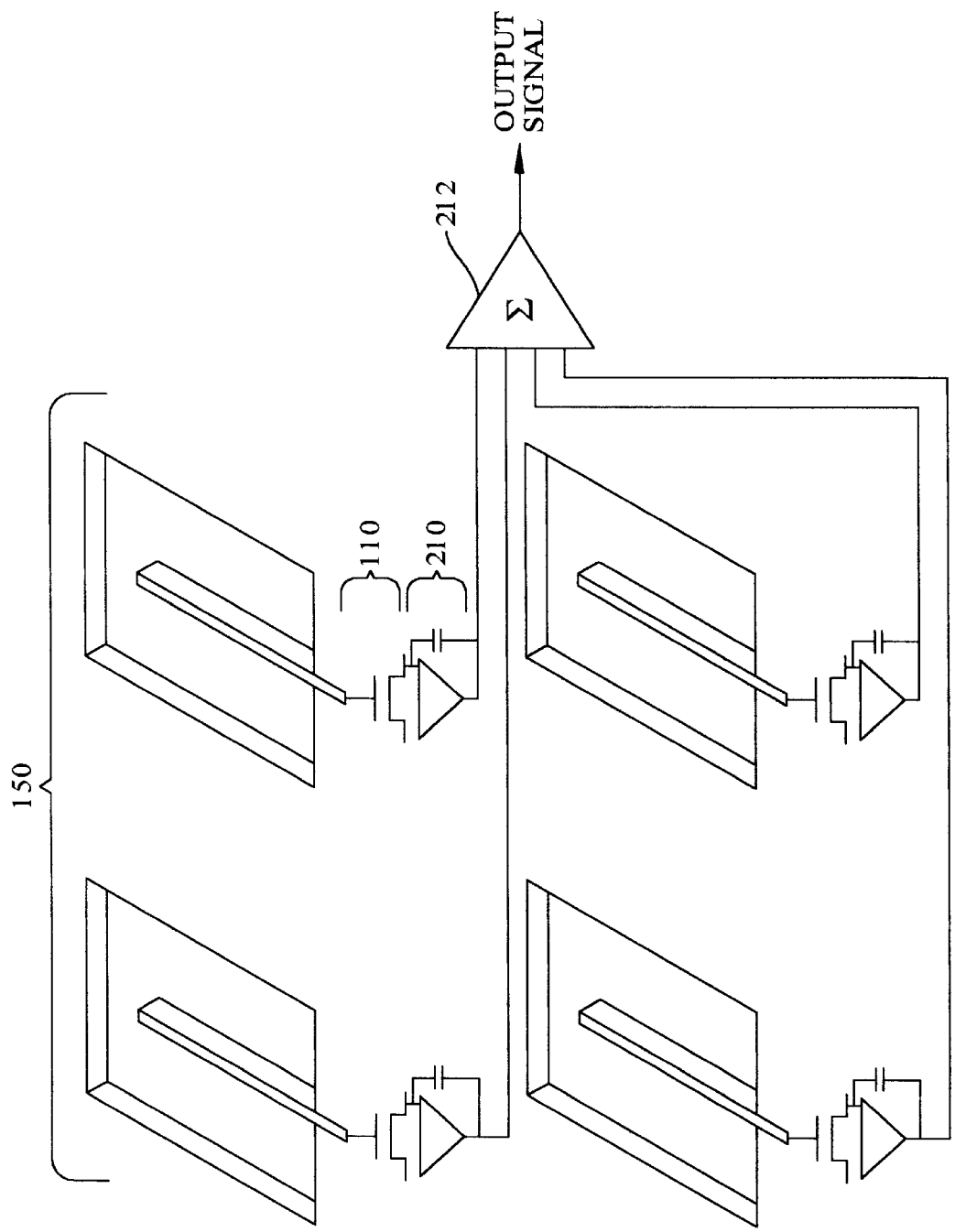
FIG. 2 illustrates a microminiature radiation detector formed in a semiconductor substrate with integrated charge amplifiers and a summing circuit.

FIG. 2 illustrates an alternate embodiment of the neutron detector that incorporates charge amplifiers 210 having inputs coupled respectively to FET's 110 and outputs coupled respectively to a summing amplifier 212 to generate the output signal. This arrangement may be used if the input voltage to FET 110 is below the gate threshold voltage and preserves the linearity of pulse amplitudes as well as increasing detection sensitivity. The signal output may be used to drive CMOS counters and muxes directly for low power count display.

If ionization wells 102 are 250 microns square by 250 microns deep (corresponding to a 100 nm wafer), an equivalent volume to the current microminiature $^3$He tubes requires about 100,000 ionization wells. Neutron detector array 150 may be packaged in a commercial package modified to withstand a pressure of about 900 psi. The top of the package may be biased to the same potential as the ionization well sides to produce a uniformity of electric field within the $^3$He gas volume.

Figure 4:
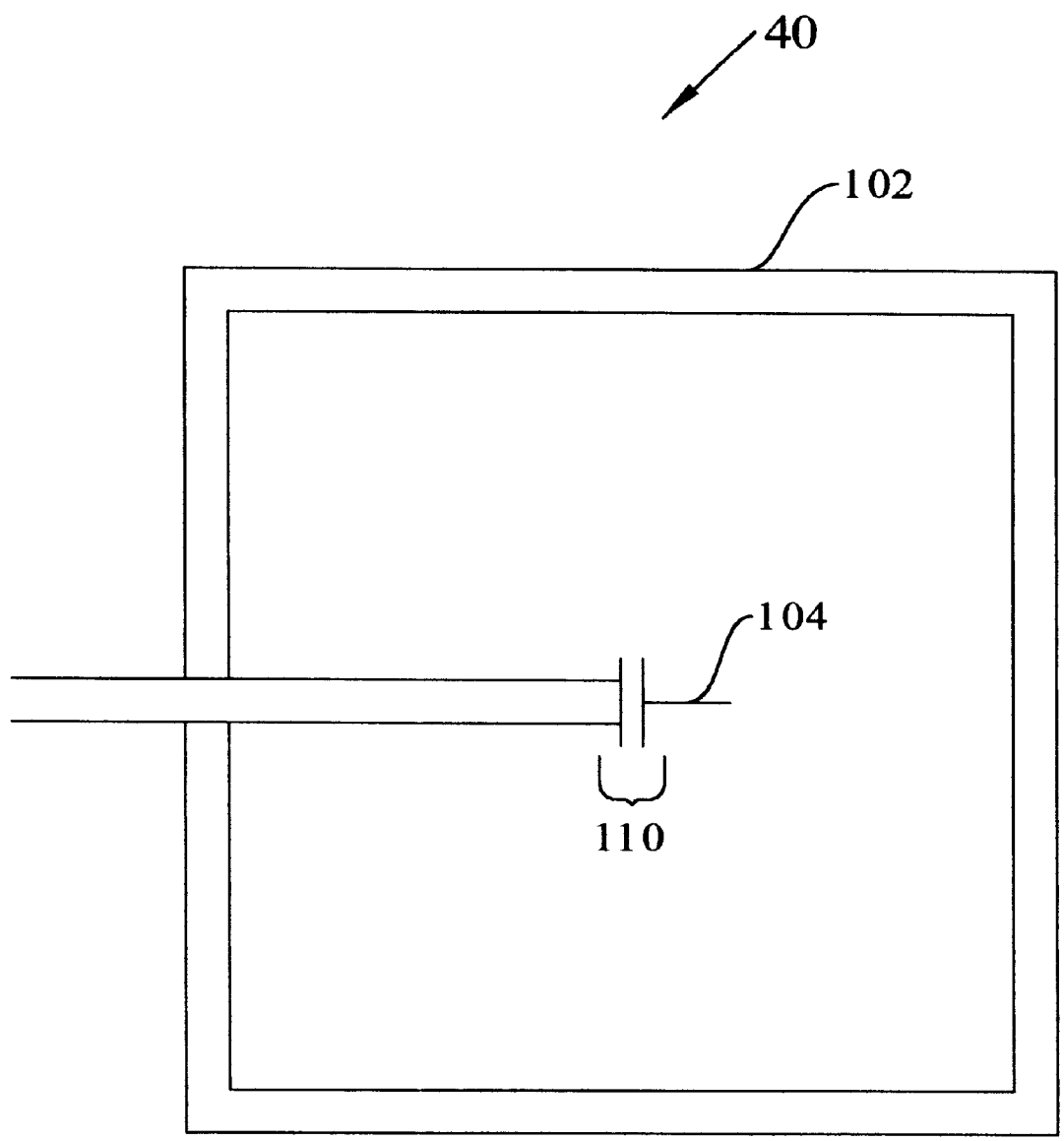
FIG. 4 illustrates a neutron detector of the present invention having reduced capacitance.

If the capacitance of ionization well 102 is significantly larger than the input capacitance of FET 110, an alternative reduced capacitance configuration 40 may be used as illustrated in FIG. 4. In this arrangement FET 110 and collection electrode 104 are located in the center of the volume of ionization well 102. The capacitance of electrode 104 may be estimated roughly by considering two concentric spheres having radii $r_1$ and $r_2$ where $r_1$ is the length of collection electrode 104 and $r_2$ is half the length of a side of ionization well 102. For $r_1=100\,\mu$m and $r_2=0.3$ cm, the expression for the capacitance of collection electrode 104 becomes $$C_e = 4\pi\epsilon_0 \frac{r_1 r_2}{r_2 - r_1} \quad (3)$$

Since $r_1 \ll r_2$, $$C_e \approx 4\pi\epsilon_0 r_1 \quad (4)$$

from which $C_e=10$ fF. This geometry thus allows the design of ionization well 102 to accommodate a variety of ionized charge volumes while preserving the benefit of small electrode capacitance.

Figure 3:
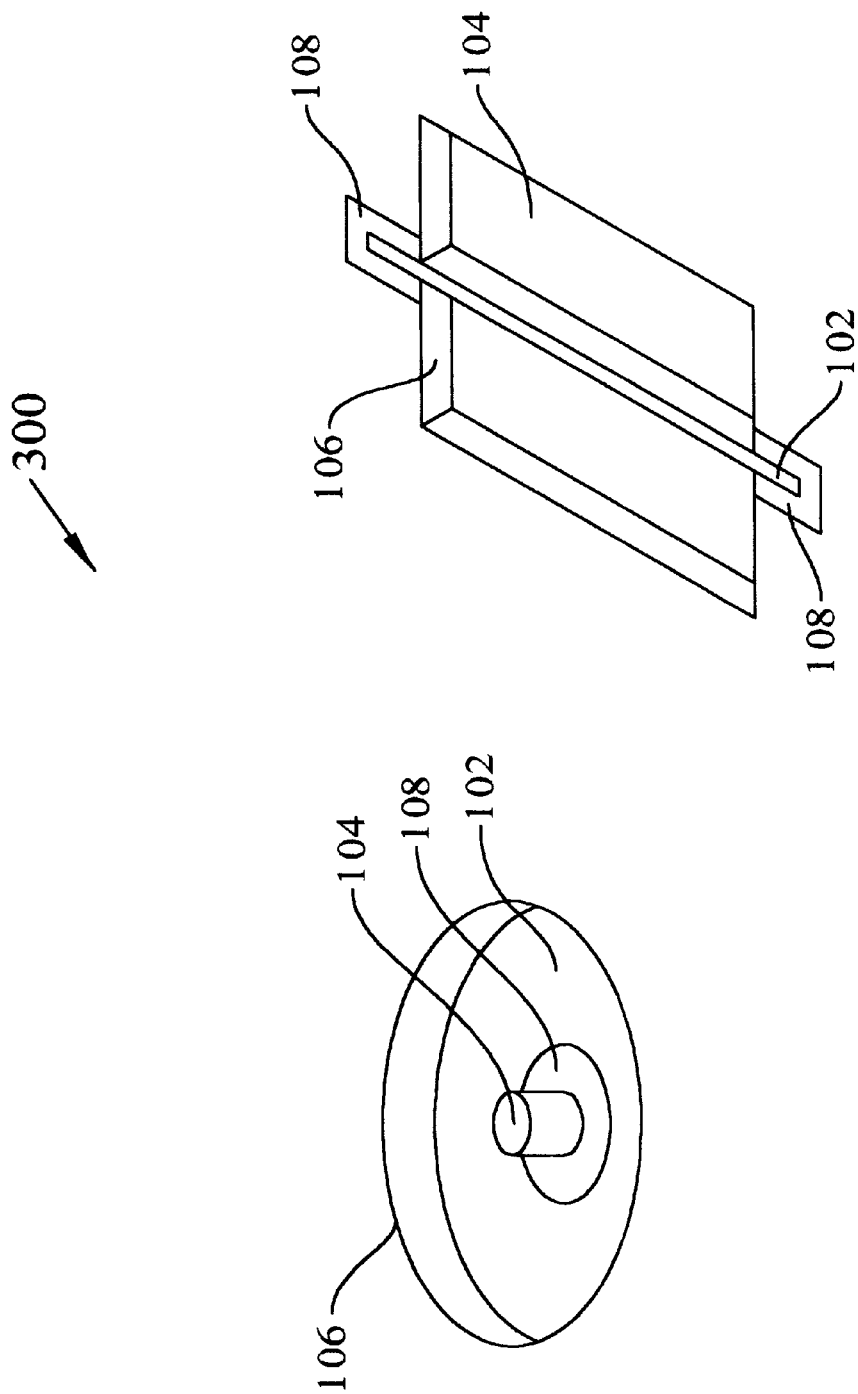
FIG. 3 illustrates alternate geometries of the present invention.

FIG. 3 illustrates alternate circular and rectangular geometries that may be used for ionization wells 102 and collection electrodes 104.

Other modifications, variations, and applications of the present invention may be made in accordance with the above teachings other than as specifically described to practice the invention within the scope of the following claims.

I claim:

1. A neutron detector comprising:

an ionization well having a volume formed in an electrically conductive substrate for coupling to a bias voltage to establish an electric field;

a pressurized atmosphere substantially filling said ionization well volume for generating ions from neutron collisions inside said ionization well;

a collection electrode for collecting said ions driven to said collection electrode by said electric field;

and a field effect transistor coupled to said ionization well substantially in the center of said ionization well volume wherein said collection electrode extends from an input of said field effect transistor.

2. The neutron detector of claim 1 wherein said pressurized atmosphere comprises $^3$He.

3. The neutron detector of claim 1 wherein said conductive substrate comprises silicon.

4. The neutron detector of claim 1 wherein said ionization well has a form that is substantially one of a cube, a rectangular prism, and a cylinder.

5. The neutron detector of claim 1 wherein said ionization well has a side dimension of about 250 microns for mitigating sensitivity reduction due to multiple well charge collection.

6. The neutron detector of claim 1 wherein said ionization well has a capacitance of about 8 fF for enhancing voltage potential at said collection electrode from said ion collisions.

7. The neutron detector of claim 1 further comprising a charge amplifier coupled to said FET for generating an amplified detection signal.

8. The neutron detector of claim 7 further comprising a summing amplifier coupled to said charge amplifier for generating a summed output signal from a multiple of said amplified detection signals.

* * * * *